Dec. 31, 1935.  T. STENHOUSE  2,026,287
METHOD OF AND APPARATUS FOR SUPPLYING GLASS TO FORMING MACHINES
Filed Sept. 5, 1933  2 Sheets-Sheet 1
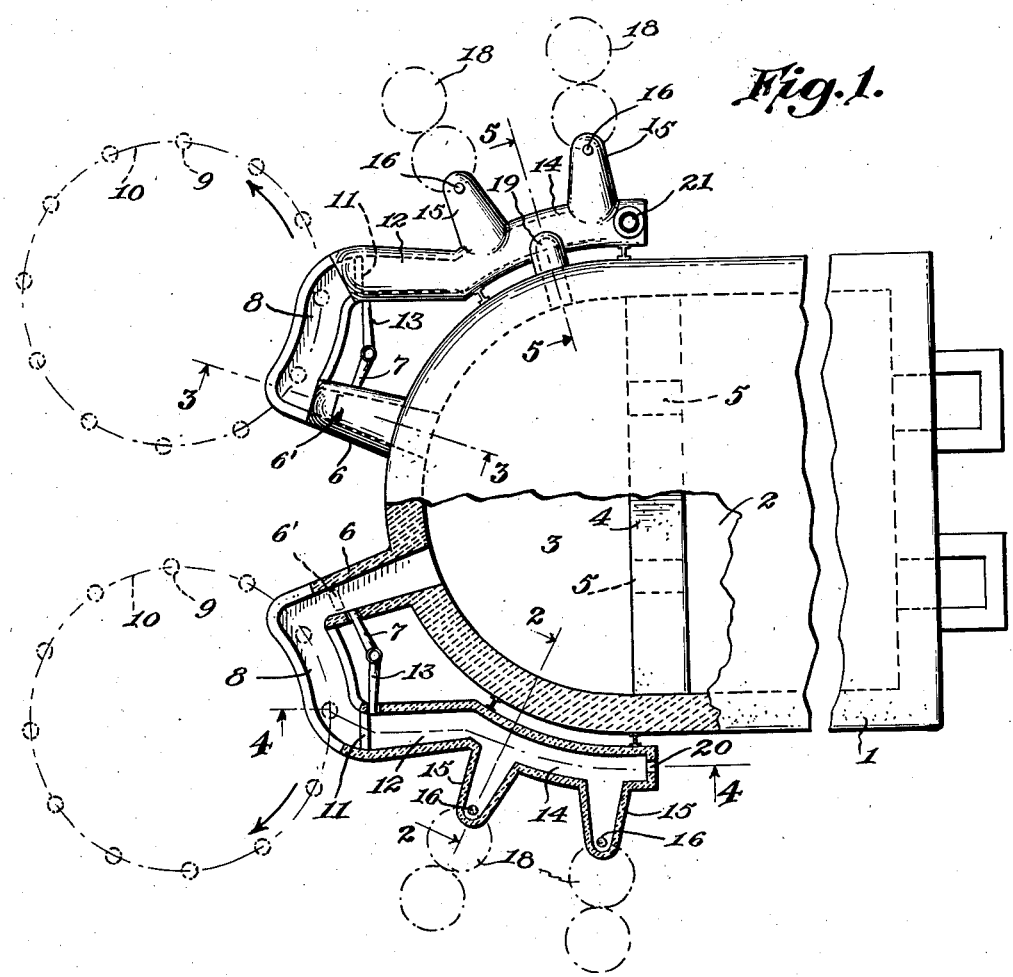
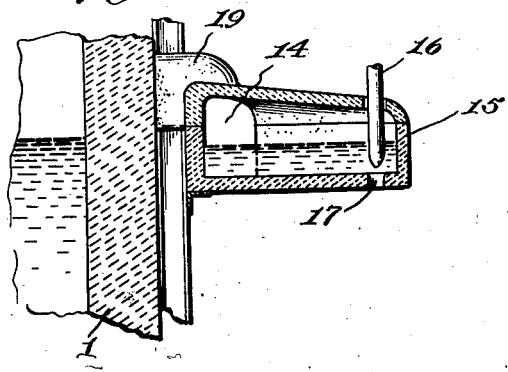
Inventor
Thomas Stenhouse Dec. 31, 1935. T. STENHOUSE 2,026,287
METHOD OF AND APPARATUS FOR SUPPLYING GLASS TO FORMING MACHINES
Filed Sept. 5, 1933   2 Sheets-Sheet 2

Inventor
Thomas Stenhouse
By Eccleston & Eccleston
Attorneys

Patented Dec. 31, 1935

2,026,287

UNITED STATES PATENT OFFICE 2,026,287

METHOD OF AND APPARATUS FOR SUPPLYING GLASS TO FORMING MACHINES

Thomas Stenhouse, Washington, Pa., assignor to Hazel-Atlas Glass Company, Wheeling, W. Va., a corporation of West Virginia Application September 5, 1933, Serial No. 688,212

6 Claims. (Cl. 49—56)

In the use of the Owens suction glass forming machine or any other suction glass forming machine, it is necessary, for reasons well known, that fresh glass be presented to the suction molds as they successively arrive at the charging zone. The common practice has been to deliver the molten glass from the refining end of the melting tank to a large pot. This pot continuously revolves and carries away from the charging zone the chilled portions of glass resulting from the charging and severing operations, so that fresh glass is presented to all of the suction molds as they successively arrive at the charging zone. While the revolving pot in conjunction with suction forming machines has been successfully used for many years, yet its operation has been very expensive because of the large loss of heat in the operation of the pot.

One of the objects of the present invention is to obtain a constant flow of virgin glass, for use with suction molds, without the revolving pot with its attendant loss of heat.

In some circumstances suction forming machines are more desirable in the manufacture of certain lines of glassware, and for other lines it is more desirable to use those types of machines in which the charges are dropped into the molds from above. Consequently, in plants which maufacture many lines of ware it is sometimes desirable to have the tanks equipped with both suction forming machines and machines to which the charges are supplied from feeders overhead. One of the objects of the present invention is to provide a continuous channel from the melting tank past the charging zone of the suction machine and thence to the forming machines which are charged by feeders. In other words the present invention involves a method and apparatus in which the feeder-forming machines set up a constant current past the charging zone of the suction forming machines.

Another object of the invention is to provide a method and apparatus such as mentioned above in which the flow of glass at the charging zone will be maintained substantially constant and at a fixed level whether or not the feeder-forming machines are in operation.

A further object of the invention is to provide means whereby the molten glass may be reheated, if necessary, after it has flowed beyond the charging zone of the suction machine.

Various other objects and advantages of the invention will be apparent to those skilled in the art, from the following detailed description taken in connection with the accompanying drawings, in which, Figure 1 is a plan view of the apparatus, showing two identical units; the tank being broken away and one of the units being shown in section.

Figure 2 is a vertical sectional view taken on line 2—2 of Figure 1.

Figure 3:
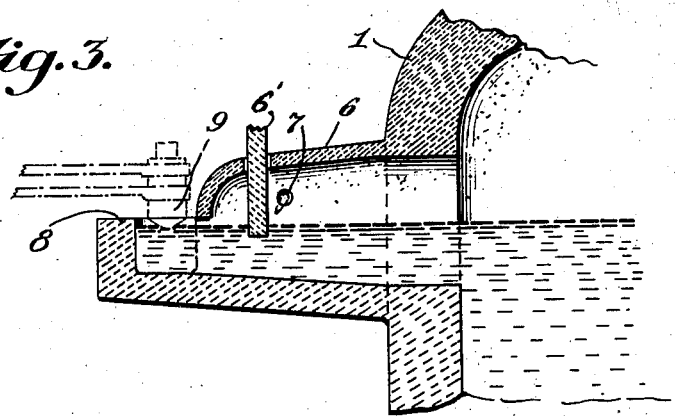
Figure 3 is a vertical sectional view taken on line 3—3 of Figure 1.
Figure 4:
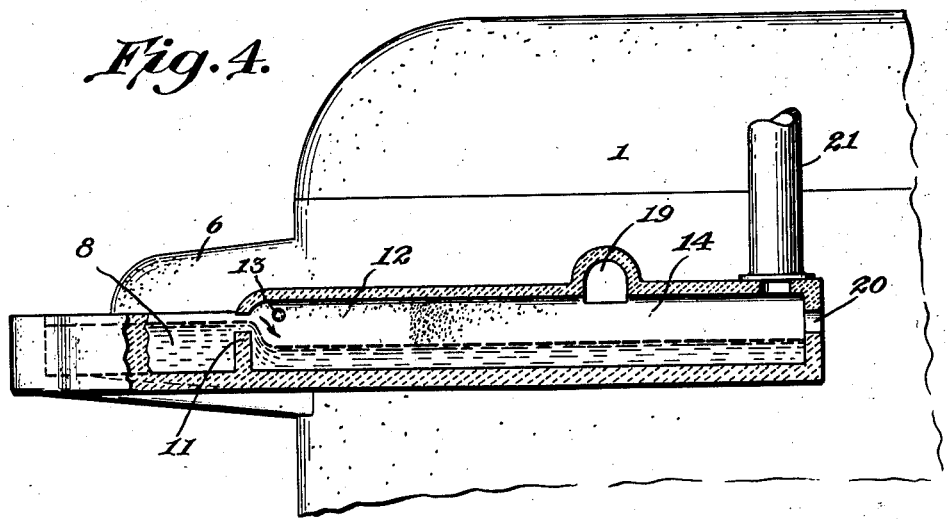
Figure 4 is a vertical sectional view taken on line 4—4 of Figure 1.
Figure 5:
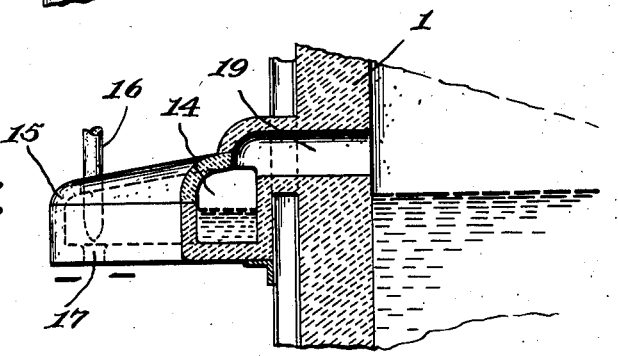
Figure 5 is a vertical sectional view taken on line 5—5 of Figure 1.

Referring to the drawings in more detail, numeral 1 indicates a continuous glass melting tank of conventional design, and comprising the usual melting section 2 and refining section 3, separated by the bridgewall 4 having passages 5 through which the glass flows into the refining end of the tank.

In the specific form illustrated two identical units are shown, each comprising one suction forming machine and two feeder-forming machines; so that only one of the units need be described. It may be mentioned, however, that the invention is in no manner limited to the specific arrangement illustrated, for it will be understood that the construction may be designed for use with only one suction forming machine to a tank in combination with any desired number of feeder-forming machines, or it may be designed for use with three suction forming machines and one or more feeder-forming machines associated with each of the units, etc. Also, some or all of the feeder-forming machines may be located on a lower floor, in accordance with the disclosure of the patent to F. C. Flint, No. 1,764,832. In other words, the invention relates broadly to a method and apparatus by which the necessary flow of glass for feeder-forming machines is made to set up and maintain a constant flow of fresh glass through a charging zone for suction forming machines.

Numeral 6 refers to a spout which projects from the refining end of the melting tank, and into which the glass flows. This spout is of course covered, and as it communicates with the tank the heat therefrom passes into the spout over the surface of the glass. Nevertheless, it is desirable to provide the spout with one or more burners 7, so that the temperature of the glass can be accurately regulated. The spout may also be provided with a skimmer block 6'.

Continuing from the spout 6, is a trough 8, into which the glass continuously flows from the spout, the level of the glass in this trough or channel being the same as that of the glass in the tank. It will be noted that the trough 8 is arcuate in shape, so that the molds 9 of the diagrammatically illustrated suction machine 10 may travel over the surface of the glass, each mold dipping into the glass in the well known manner, as they continuously travel over the charging zone.

The trough 8 is preferably provided with a submerged dam 11, located beyond the point where the suction molds are lifted from the glass. This submerged dam separates the charging zone from the remainder of the trough construction, so that within certain limits the glass will be maintained at a constant level at the charging zone irrespective of minor fluctuations in the level of the glass beyond the dam.

Beyond the submerged dam the trough is covered and that portion indicated by numeral 12 is preferably a reheating chamber, by means of which all of the glass flowing through the channel is brought to a uniform temperature, so that all chilled portions resulting from the charging and severing operations of the suction machine will be eliminated. This reheating section of the trough is preferably provided with one or more burners 13, by which the glass is brought up to the required temperature, if it has fallen below the desired working temperature. This heating section is also preferably supplied with heat from the melting tank, as will appear hereinafter.

That portion of the trough or channel beyond the reheating chamber is referred to by numeral 14 and may be termed the feeder trough. This trough is of course covered to retain the heat, and projecting from this trough are ordinary flow spouts 15 in which feeders 16 are located. I have diagrammatically illustrated conventional reciprocating plug feeders which discharge the glass through discharge orifices 17. The gobs of glass, when severed, drop into the forming machines 18. Obviously any desired type of feeder may be employed in place of the conventional reciprocating plug feeders, and the number of flow spouts and feeders will vary in different installations.

In the preferred construction I provide one or more passages 19 leading from the tank 1 to the top or side of the trough so that heat from the interior of the tank may pass to the interior of the trough. The drawings show one such passage for each of the units, and the passage communicates with that portion of the trough from which the flow spouts 15 lead. The heat thus transmitted to this section of the trough heats not only this section of the trough, but also passes on and assists in raising the temperature of the reheating section 12. It will be understood that the number and location of the passages 19 for transmitting heat from the interior of the melting tank may vary widely in different installations; and if preferred they may be entirely omitted and the temperature of the glass would then be regulated entirely by burners.

The end of the feeder trough section 14 is closed except for an overflow port 20. The bottom of this port is preferably located slightly below the top of the submerged dam so that there will be a continuous flow of glass through the charging zone for the suction machine, even in the event that the machines 18, by reason of a shut-down or otherwise, are unable to use the entire quantity of glass delivered from the charging zone. When under abnormal conditions glass flows through the discharge port 20, it forms cullet.

Numeral 21 refers to a chimney which is provided for the escape of the products of combustion.

It is thought that the method and apparatus will be understood from the foregoing description, and therefore only a brief description of the operation will be given.

The trough or channel is continuous from the melting tank to the last feeder-forming machine, where it ends. The molten glass flows continuously from the refining tank and continues through the trough in a steady stream, portions of the glass being consumed by the various forming machines during its course through the trough.

The glass in the arcuate portion 8 of the trough, which is the charging zone for the suction forming machine, is at substantially the level of the glass in the melting tank, and is maintained at the desired temperature. The molds of the suction machine, which may be of the Owens type or any other type, travel continuously, and as each mold reaches the charging zone it is automatically dipped slightly below the surface of the glass. During its continued travel glass is drawn into the mold, and while still travelling the charge of glass in the mold is severed from the glass in the pool. These charging and severing operations leave chilled portions of glass in the pool and these portions must be quickly carried out of the path of the oncoming molds. As stated hereinbefore, the common practice has been to revolve a large pot containing the pool of glass. In accordance with the present invention this expensive pot operation is eliminated; and the chilled portions of glass are carried out of the path of the oncoming molds by continuously flowing the glass onward through the trough, so that virgin glass is presented to each successive mold.

The glass at the charging zone must be maintained at substantially a constant level, and for the purpose of preventing minor fluctuations in this level, due to possible irregularities in the operation of the feeder-forming machines, a submerged dam is placed at the end of the charging zone. The glass from the charging zone flows over this dam to a lower level in the trough beyond; this lower level being maintained by the consumption of glass therein by the feeder-forming machines, or under abnormal conditions when this consumption of glass is not sufficiently rapid, discharging the glass through a port arranged at a lower level than the top of the submerged dam. There is thus maintained two pools of glass, one at a higher level for charging suction forming machines, and one at a lower level for charging feeder-forming machines. Any change in the level of the glass in the lower pool does not affect the level of the glass in the higher pool, for the two pools are separated by the submerged dam, and if the level of the lower pool should closely approach that of the higher pool, the emergency overflow port will come into action and prevent further rise in the level of the glass in the lower pool.

It will be understood, of course, that any desired means may be employed for raising or lowering the temperature of the glass supplied to suction machines and to the feeder-forming machines, so that the glass delivered will be at the proper working temperature for the particular machine. In the specific embodiment illustrated burners are shown at various points, and passages are also provided to transmit heat from the interior of the tank, but obviously the invention is not limited to any particular arrangement for either raising or lowering the temperature of the glass at any desired point during its flow. In most installations it will be desirable, of course, to provide the reheating chamber beyond the first pool, so that the chilled portions of glass resulting from the charging of the suction molds will disappear before the glass is supplied to the feeder-forming machines.

It will also be understood that the invention is in no manner limited to any particular arrangement or number of either suction forming machines or feeder-forming machines, for obviously the arrangement, number of machines, etc., will depend upon the particular tank and the requirements thereof. And, as stated hereinbefore, where it is desirable glass may be delivered from the lower pool to forming machines on a lower floor, as disclosed in Flint Patent No. 1,764,832.

Having fully described the invention, what I claim as new is:

1. The method of supplying glass to forming machines which consists in flowing glass from a melting tank through a trough to the charging zone of a suction forming machine, flowing the glass by gravity over a submerged dam beyond the charging zone, and maintaining the glass in the trough beyond the submerged dam at a lower level by delivering it to feeder-forming machines.

2. The method of supplying glass to forming machines which consists in flowing glass from a melting tank through a trough to the charging zone of a suction forming machine, flowing the glass over a submerged dam beyond the charging zone, maintaining the glass in the trough beyond the submerged dam at a lower level by delivering it to feeder-forming machines, and permitting the the glass beyond the dam to overflow independently of delivery to feeder-forming machines when its level closely approaches the level of the glass above the submerged dam.

3. The method of supplying glass to forming machines which consists in flowing glass from a melting tank to a pool for charging suction machines, flowing the glass from such pool to another pool maintained at a lower level for charging feeder-forming machines, and permitting the glass of the second pool to overflow independently of delivery to feeder-forming machines when its level closely approaches the glass level of the first pool.

4. Apparatus for supplying glass to forming machines including a melting tank, a trough receiving glass from the melting tank, a submerged dam in the trough forming two pools of glass at different levels, the glass above the dam being maintained at a constant level and constituting a charging zone for suction forming machines, means for preventing the glass below the dam from reaching the level of the glass above the dam, and means for feeding the glass below the dam to feeder-forming machines.

5. Apparatus for supplying glass to forming machines including a melting tank, a trough receiving glass from the melting tank, said trough having a charging zone for suction forming machines, means for feeding glass from the trough beyond the charging zone to feeder-forming machines, whereby the glass is maintained at a lower level than at the charging zone, and means for overflowing the glass independently of delivery of feeder-forming machines when it closely approaches the level of the glass at the charging zone.

6. Apparatus for supplying glass to forming machines including a melting tank, a trough receiving glass from the melting tank, means for dividing the glass in the trough into two pools at different levels, the first pool constituting a charging zone for suction forming machines, the second pool receiving glass from the first pool, means for reheating the glass flowing from the first pool to the second pool, means for feeding glass from the second pool to feeder-forming machines, and means for overflowing glass from the second pool when its level closely approaches that of the glass in the second pool.

THOMAS STENHOUSE.